(12) United States Patent
Byrne

(10) Patent No.: US 8,556,436 B2
(45) Date of Patent: Oct. 15, 2013

(54) RETROREFLECTIVE SURFACES FOR ARTICLES

(76) Inventor: Timothy Byrne, South Elgin, IL (US)

( * ) Notice: Subject to any disclaimer, the term of this patent is extended or adjusted under 35 U.S.C. 154(b) by 257 days.

(21) Appl. No.: 13/035,759

(22) Filed: Feb. 25, 2011

(65) Prior Publication Data

US 2011/0211258 A1 Sep. 1, 2011

Related U.S. Application Data

(60) Provisional application No. 61/308,682, filed on Feb. 26, 2010.

(51) Int. Cl.
*G02B 5/124* (2006.01)

(52) U.S. Cl.
USPC .......................................................... 359/530

(58) Field of Classification Search
USPC ................................................. 359/530, 531
See application file for complete search history.

(56) References Cited

U.S. PATENT DOCUMENTS

| | | | |
|---|---|---|---|
| 1,609,322 A | 12/1926 | Stetson | |
| 2,337,703 A | 12/1943 | Wood | |
| 3,889,027 A | 6/1975 | White et al. | |
| 3,895,856 A | 7/1975 | Bickel et al. | |
| 3,918,795 A | 11/1975 | Lindner et al. | |
| 3,963,309 A | 6/1976 | Schwab | |
| 4,069,787 A | 1/1978 | Wyckoff | |
| 4,177,826 A | 12/1979 | Luckenbill | |
| 4,236,788 A | 12/1980 | Wyckoff | |
| 4,506,467 A | 3/1985 | Strung | |
| 4,775,030 A | 10/1988 | Wright | |
| 5,373,863 A | 12/1994 | Prizio | |
| 5,539,627 A | 7/1996 | Foster | |
| 5,592,960 A | 1/1997 | Williams | |
| 5,750,191 A | 5/1998 | Hachey et al. | |
| 6,132,861 A | 10/2000 | Kang et al. | |
| 6,220,717 B1 | 4/2001 | Pastore | |
| 6,260,507 B1 | 7/2001 | Simpson | |
| 6,261,691 B1 | 7/2001 | Atarashi | |
| 6,265,061 B1 | 7/2001 | Kang et al. | |
| 6,551,014 B2 * | 4/2003 | Khieu et al. | 359/531 |
| 6,623,793 B2 | 9/2003 | Mushett et al. | |
| 6,712,286 B2 | 3/2004 | Baxter et al. | |
| 6,772,711 B2 | 8/2004 | Morgan | |
| 6,857,579 B2 | 2/2005 | Harris | |
| 6,935,360 B2 | 8/2005 | Knappmiller | |
| 6,966,660 B1 | 11/2005 | Buccellato et al. | |
| 7,525,424 B2 | 4/2009 | Morse et al. | |
| 7,735,423 B1 | 6/2010 | Gold | |
| 7,814,700 B2 * | 10/2010 | Groth | 43/2 |
| 2002/0063960 A1 | 5/2002 | Fritz | |
| 2003/0148026 A1 | 8/2003 | Mushett | |
| 2005/0040946 A1 | 2/2005 | Hogg et al. | |
| 2006/0256439 A1 | 11/2006 | Yukawa et al. | |
| 2008/0264460 A1 | 10/2008 | Hentschel | |
| 2009/0070967 A1 | 3/2009 | Gonzalez | |
| 2010/0186279 A1 | 7/2010 | Groth | |

* cited by examiner

*Primary Examiner* — Euncha Cherry
(74) *Attorney, Agent, or Firm* — Erickson Law Group, PC

(57) ABSTRACT

The present invention comprises retroreflective surfaces used on both hunting structures and fire hydrants. A retroreflective surface is added to both of these by way of retroreflective liquid coating, powder coating, and/or retroreflective tape. The retroreflective surfaces may comprise an entire outside surface of the hunting structure or fire hydrant caps, or it may comprise only a portion of the outside surface. Because of their retroreflective properties, both the hunting structures and the fire hydrant caps may be seen more easily. Because retroreflective liquid coating, powder coating, or tape is to be used, these designs are inexpensive, easy to install, and environmentally friendly.

20 Claims, 4 Drawing Sheets

RETROREFLECTIVE SURFACES FOR ARTICLES

This application claims the benefit of U.S. Provisional Application Ser. No. 61/308,682 filed Feb. 26, 2010.

FIELD OF THE INVENTION

The present invention relates to reflective structures, more specifically reflective hunting structures and fire hydrants.

BACKGROUND OF THE INVENTION

Historically, it has been recognized by hunters that some form of concealment is advantageous when hunting game. This concealment can come in the form of a blind, a tree stand, or a variety of other structures. Some of these structures are portable, to be carried by the hunter, and some of these structures are left in the wild for the hunter's return and repeated use.

Blinds may be one wall between the hunter's hiding spot and the animals, or may partially or fully surround the hunter for concealment from several angles or for weather protection. The blind may be a portable tent, or other ground structure. Elaborate structures with shingled roofs, doors, sliding or hinged windows, chairs and benches are known.

Because hunters have also recognized that hunting from above an animal's field of vision is advantageous, tree stand blinds are also popular. Tree stands are open or enclosed platforms mounted in trees. Such tree stands provide a suitable observation station in which the hunter may be comfortably concealed from his surrounding environment.

When these structures are small and portable, the hunter may transport them to and from the hunting location each time he returns to hunt. These structures would be included in the hunter's gear to include on his hunting trip. In other scenarios, the structures may not be easily portable. In many cases, a hunter will have a permanent structure located at a selected location in the woods. Then, day after day or year after year, the hunter may return to the same selected location and make use of the structure, such as a blind, tree stand, and the like.

For structures that are left at the selected location, the present inventor has recognized that the hunter needs the ability to quickly and easily find the structure, particularly at night. The area in which he is hunting may be large and densely forested, and finding of the structure may be difficult. The hunter may be hunting at night, in poor weather conditions, or in an area of thick foliage. In any of these conditions, visibility may be low, and the hunting structure may be difficult to find. In other cases, visibility may not be low, but the structure may be difficult to find due to the size of the surrounding area or other reason.

Systems for locating hunting structures exist, such as described in U.S. Pat. Nos. 6,220,717 and 6,712,286. These patents describe mirrors attached to hunting structures. In order to locate the hunting structures, these patents suggest that a hunter shines a light source to locate the mirror, and in turn locate the hunting stand.

The present inventor has recognized that types of designs for locating hunting structures have drawbacks. First, a mirror only reflects significant light back to the source if the angle of incidence is zero. Therefore, light shone by a light source on a mirror is not going to be seen near the light source unless the beam of the flashlight is substantially normal to the surface. In this way, the light would only be properly reflected and the structure findable from very specific, limited locations. Therefore, this design would, in most cases, be no help in aiding a hunter in finding a hunting structure.

In addition, the present inventor has recognized that these designs may have limited durability. Since these devices would be located permanently outdoors, they need to be able to withstand all the elements of nature. That is, these devices need to be able to withstand rain, ice, wind, breaking or falling tree branches, and all other possible occurrences of nature. Mirror type devices would not be expected to withstand the constant onslaught of nature and the four seasons over the course of perhaps years.

Furthermore, the present inventor has recognized that because of the remote locations of these hunting structures as well as the limited construction conveniences in the wilderness, these devices may be difficult to set up and these designs may be difficult to effect. A mirror may be clamped to a protrusion of a hunting structure only if there is such a protrusion. Similarly, a mirror may be attached to the surface of a hunting structure if the surfaces adhere well and if it remains unaffected by obstructions.

Fire hydrants are used to supply water to firefighters at, around or in buildings to fight fires. The present inventor has recognized that it would be desirable to provide a device to fire hydrants which would aide firefighters in finding the hydrants in low light conditions or darkness. U.S. Pat. No. 6,260,507 shows a reflective collar that can be attached to the periphery of fire hydrants to assist firefighters in locating them.

The present inventor has recognized the need for a reflective surface on a hunting structure that is easily detectable in any conditions by a searching hunter.

The present inventor has further recognized the need for a reflective surface on a hunting structure that is durable as to retain its effectiveness through the uncooperative elements of nature.

The present inventor has recognized the need for a reflective surface on a hunting structure that is easily created regardless of the shape, size, design, or location of the structure.

The present inventor has further recognized the need for a reflective surface to be applied to a fire hydrant located in the field that increases the ability of firefighters to locate the fire hydrant, especially in low light conditions or darkness.

SUMMARY OF THE INVENTION

One exemplary embodiment of the present invention comprises a powder coated retroreflective surface applied on an outside surface of hunting structures. The retroreflective surface may comprise a wall, a blind portion, a roof, a floor, a ladder, or other part of the hunting structure. In addition, the retroreflective surface is easy to install, relatively inexpensive, and relatively harmless to the environment. These features are ensured because the retroreflective surface is applied to a metal, preferably aluminum, or plastic such as a UV resistant polycarbonate, by liquid coating, by powder coating, and/or by applying retroreflective tape. This retroreflective surface provides a surface on a hunting structure that reflects light back at a hunter when probed by an exploratory light source, such as a flashlight.

Another exemplary embodiment of the invention includes a retroreflective cap cover fitted to a fire hydrants pumper or nozzle cap in order for firefighters to find the fire hydrant in low light conditions or darkness. Advantageously, the retroreflective surface is achieved by applying retroreflective liquid coating, powder coating, or tape to a separate part in a shop which can then be attached to the fire hydrant cap in the field.

The part can be composed of metal, preferably aluminum, or plastic such as a UV resistant polycarbonate. Advantageously, the cap cover can be liquid coated or powder coated with a retroreflective coating and/or by applying retroreflective tape and then fastened to a fire hydrant.

The process for powder coating the retroreflective surface can be as described in U.S. Pat. No. 6,623,793, or U.S. Published application 2003/0148026, both herein incorporated by reference.

Numerous other advantages and features of the present invention will become readily apparent from the following detailed description of the invention and the embodiments thereof, and from the accompanying drawings.

DETAILED DESCRIPTION OF THE PREFERRED EMBODIMENTS

Figure 1:
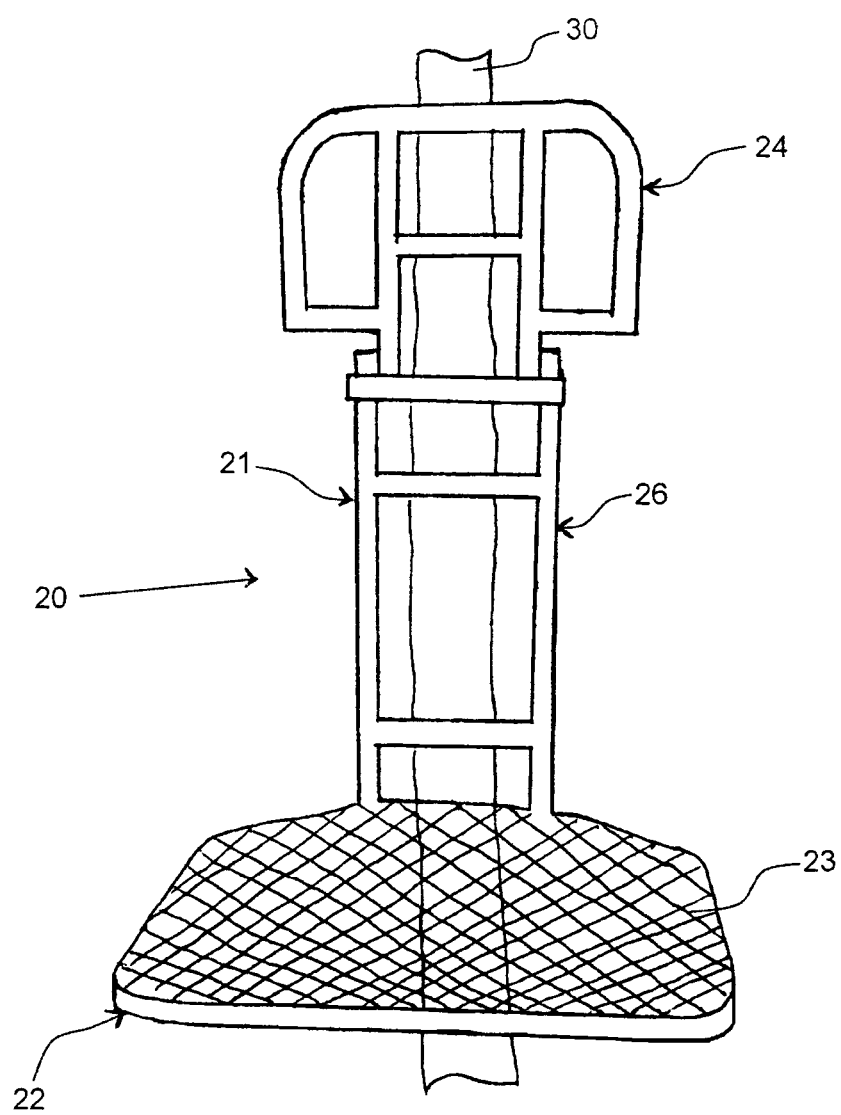
FIG. 1 is a front view of an open tree stand of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an embodiment of the present invention. FIG. 1 shows an open tree stand 20. Open tree stand 20 has a framework 21 that includes a bottom platform 22, a top platform 24, and a tree attaching portion 26 attached to a tree trunk 30. Top platform 24 rotates with respect to tree attaching portion 26 to become alternately parallel and perpendicular with bottom platform 22. Bottom platform 22 includes surface 23.

Each of these sections can be made of metal, plastic, wood, or other material. Preferably, these sections, including the bottom platform 22, top platform 24, and tree attaching portion 26, comprise retroreflective outside surfaces. A retroreflective coating to the outside surfaces of the bottom platform 22, top platform 24, and tree attaching platform 26 can be applied by powder coating. Alternately the retroreflective coating could be applied by liquid coating or by application of retroreflective tape. Accordingly, when light impinges any of these retroreflective surfaces 22, 24, 26, the light is reflected back in the direction of the source.

Figure 2:
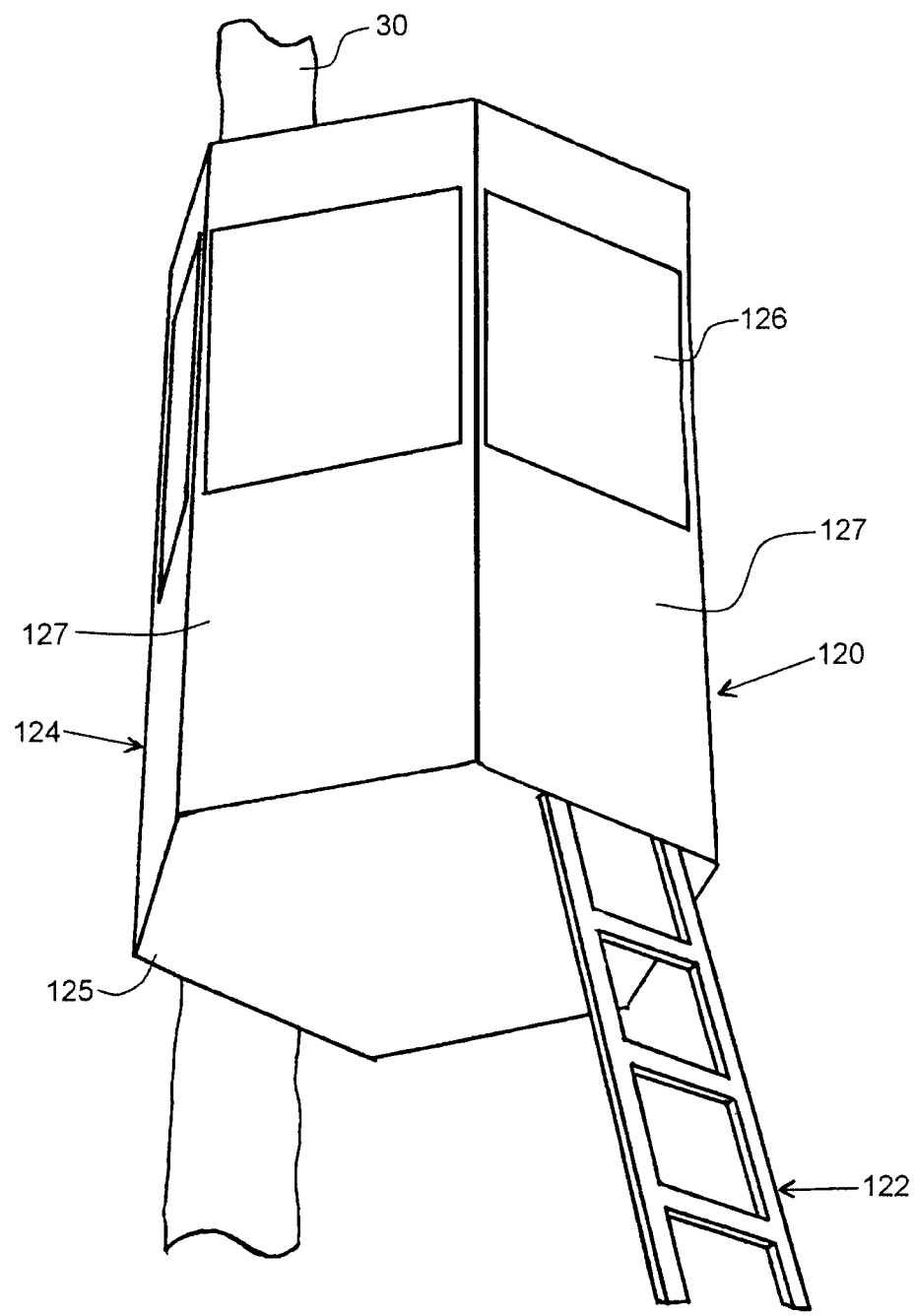
FIG. 2 is a perspective view of a closed tree stand of the present invention.

FIG. 2 shows another embodiment of the present invention. FIG. 2 shows a closed tree stand 120. Closed tree stand 120 includes floor 125, enclosure 124, windows 126, ladder 122, and roof 128 (not shown). Closed tree stand is attached to a tree trunk 30. The enclosure 124 of closed tree stand 120 comprises a plurality of panels 127.

The different parts of closed tree stand 120 can be made of metal, plastic, wood, or other material. Preferably, these parts, including the panels 127, ladder 122, roof 128, and floor 125 comprise retroreflective surfaces. Liquid coating, powder coating and/or tape can be used to add a retroreflective coating to the outside surfaces of the panels 127, ladder 122, roof 128, and floor 125. When light hits any of these retroreflective surfaces 127, 122, 128, 125, it is reflected back in the direction of the source.

Figure 3:
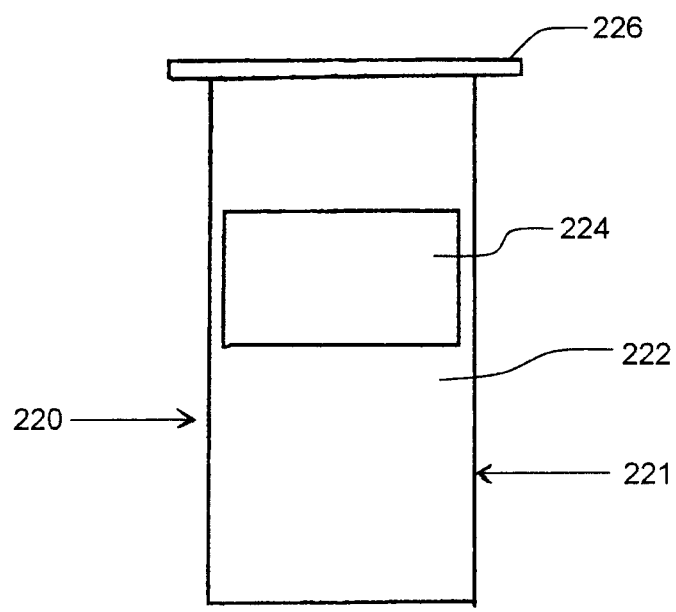
FIG. 3 is a front view of a hunting blind of the present invention.

FIG. 3 shows another embodiment of the present invention. FIG. 3 shows a ground level hunting blind 220. Hunting blind 220 comprises a body 221 comprising at least one panel 222. Hunting blind 220 further comprises windows 224 and roof 226. Hunting blind 220 may further comprise a floor 227 (not shown) or may rest on the ground.

The different parts of hunting blind 220 can be made of metal, plastic, wood, or other material. Preferably, these parts, including the panels 222 and the roof 226 can comprise retroreflective surfaces. Liquid coating, powder coating and/or retroreflective tape can be used to add a retroreflective material to the outside surfaces of the panels 222 and the roof 226. When light impinges on any of these retroreflective surfaces 222, 226, the light is reflected back in the direction of the source.

Figure 5:
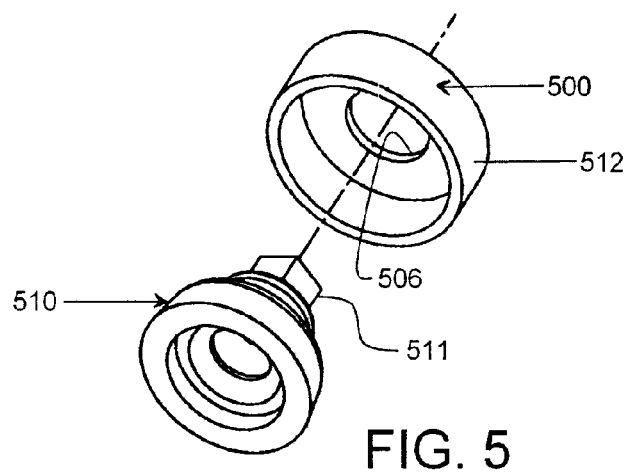
FIG. 5 is a bottom, fragmentary, exploded perspective view of the fire hydrant cap and the cap cover of FIG. 4.
Figure 6:
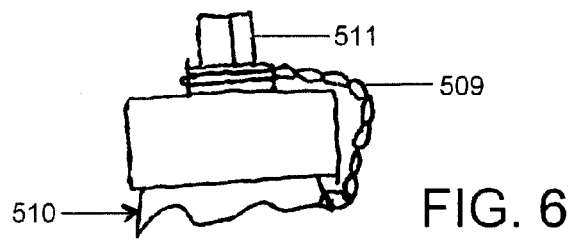
FIG. 6 is an elevation view of the cap cover 500 mounted onto the hydrant cap.
Figure 4:
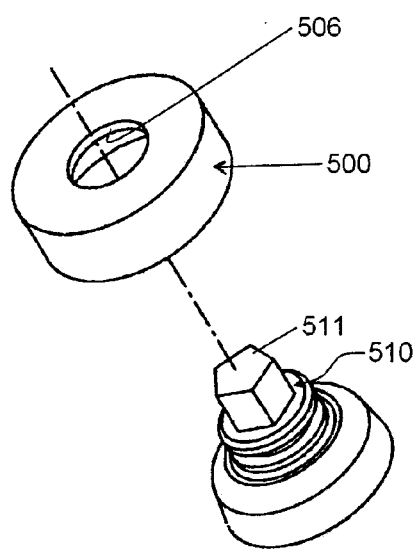
FIG. 4 is a top, fragmentary, exploded perspective view of a fire hydrant cap and a cap cover according to the present invention.

FIGS. 4 and 5 illustrate another embodiment of the invention. According to this embodiment, a cap cover 500, such as a metal or plastic cover with a central hole 506 is sized and configured to fit over the top of a fire hydrant pumper or nozzle cap 510, such as one part of a hydrant disclosed for example in U.S. Pat. No. 4,177,826, herein incorporated by reference. The hole 506 allows a fire hydrant valve operating nut 511 to protrude through the cap cover 500. The cap cover 500 is secured onto the hydrant by the cap chain 509 which is present to tether the cap 511 to the body of the hydrant. The chain 509 is separated from the cap 511, the cap is installed and the chain is re-secured to the cap, which chain now captures the cap cover onto the hydrant. Alternately the cap cover can be held by a friction fit, or by fasteners, or by welding or by another known means. The cap cover 500 has a retroreflective outside surface 512 that is advantageously created by liquid coating or powder coating a retroreflective coating and/or by applying retroreflective tape onto the cap cover. The powder coating can be applied as previously described in the prior art publications.

Although the above-described embodiments pertain to fire hydrants and hunting structures, the invention can also be applied to baby strollers and other structures where an increased visibility in low light environments is desired.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A hunting structure comprising:
   a hunting structure providing a hunting station for a hunter that has a support that supports a hunter and having at least one outside surface, the outside surface being retroreflective.

2. The hunting structure of claim 1, wherein the surface is applied onto a part of the structure selected from the group consisting of framework, platforms, walls, roof, floor and ladder.

3. The hunting structure of claim 1, wherein the structure is at least partly composed of metal and the surface comprises a powder-coated retroreflective material.

4. The hunting structure of claim 1, wherein the outside surface is adapted to be retroreflective by application of a retroreflective powder-coating.

5. The hunting structure of claim 1, wherein the outside surface is adapted to be retroreflective by application of a retroreflective liquid coating.

6. The hunting structure of claim 1, wherein the outside surface is adapted to be retroreflective by the application of retroreflective tape.

7. The hunting structure according to claim 1, wherein the hunting structure comprises a tree stand having a framework comprising at least a bottom platform, wherein outside surface is carried on framework.

8. The hunting structure according to claim 7, wherein the framework comprises top platform and a tree attaching portion, the top platform, the tree attaching portion and the bottom platform all being coated with a retroreflective coating.

9. A body adapted to be affixed to a fire hydrant comprising:
- a body having at least one exterior surface adapted to be retroreflective; and
- wherein the body is configured to be engageable with a fire hydrant.

10. The body of claim 9, wherein the body is configured to be cap shaped with one central through hole.

11. The body of claim 9, wherein the body comprises a material selected from the group consisting of aluminum and UV resistant polycarbonate.

12. The body of claim 9, wherein the exterior surface is adapted to be retroreflective by application of a retroreflective powder-coating.

13. The body of claim 9, wherein the exterior surface is adapted to be retroreflective by application of a retroreflective liquid coating.

14. The body of claim 9, wherein the exterior surface is adapted to be retroreflective by the application of retroreflective tape.

15. The body of claim 9, wherein the body is composed of metal.

16. The body of claim 15, wherein the metal comprises aluminum.

17. The body of claim 14, wherein the body is composed of plastic.

18. The body of claim 17, wherein the plastic comprises UV resistant polycarbonate.

19. A method of manufacturing a fire hydrant locator comprising the steps of:
- forming a cap-shaped body having a through hole for receiving an operating nut of the fire hydrant; and
- applying a retroreflective surface to the cap-shaped body.

20. The method according to claim 19, wherein the step of applying a retroreflective surface is further defined in that the retroreflective surface is power-coated onto the cap-shaped body.

* * * * *